United States Patent
Van Phan et al.

(10) Patent No.: US 9,247,554 B2
(45) Date of Patent: Jan. 26, 2016

(54) NETWORK CONTROL TO DIRECT USER DEVICES IN MUTUAL MACHINE-TO-MACHINE COMMUNICATIONS INTO UNLICENSED FREQUENCY BANDS TO DECREASE INTERFERENCE

(75) Inventors: Vinh Van Phan, Oulu (FI); Gilles Charbit, Hampshire (GB); Timo Koskela, Oulu (FI); Sami Hakola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 289 days.

(21) Appl. No.: 13/879,856

(22) PCT Filed: Oct. 18, 2010

(86) PCT No.: PCT/EP2010/065651
§ 371 (c)(1),
(2), (4) Date: Jun. 17, 2013

(87) PCT Pub. No.: WO2012/052050
PCT Pub. Date: Apr. 26, 2012

(65) Prior Publication Data
US 2013/0265961 A1    Oct. 10, 2013

(51) Int. Cl.
*H04W 4/00* (2009.01)
*H04W 72/06* (2009.01)
*H04L 29/08* (2006.01)
*H04W 72/08* (2009.01)

(52) U.S. Cl.
CPC ............. *H04W 72/085* (2013.01); *H04L 67/12* (2013.01); *H04W 4/00* (2013.01); *H04W 4/005* (2013.01); *H04W 72/06* (2013.01)

(58) Field of Classification Search
None
See application file for complete search history.

(56) References Cited

U.S. PATENT DOCUMENTS 7,627,326 B1 * 12/2009 Miller, II ................. 455/454
2003/0143945 A1 * 7/2003 Chadwick .............. 455/3.01
(Continued)

FOREIGN PATENT DOCUMENTS

CN    101400077 (A)    4/2009

OTHER PUBLICATIONS

3GPP TSG-RAN-WG1 Meeting #54bis, Prague, Czech Republic, Sep. 29-Oct. 3, 2008, R1-083850, "M2M Communication", Alcatel-Lucent, 7 pgs.
(Continued)

*Primary Examiner* — Jenee Williams
(74) *Attorney, Agent, or Firm* — Harrington & Smith

(57) ABSTRACT

Apparatuses, methods, computer programs, and computer-readable media are disclosed. A network node defines two or more user device groups, one of the user device groups using a licensed frequency band and another using an unlicensed frequency band. Timing advance parameters of user devices are determined. The user devices are assigned into one of the user device groups based on comparison of the timing advance parameters in such a manner that if a magnitude of differences of timing advance parameters of the user devices having mutual machine-to-machine communications exceeds the a timing advance parameter of at least one user device communicating with the network node, the user devices having the mutual machine-to-machine communications are directed into the user device group using the unlicensed frequency band for decreasing interference.

14 Claims, 4 Drawing Sheets

(56) References Cited

U.S. PATENT DOCUMENTS

| | | | |
|---|---|---|---|
| 2004/0203815 A1* | 10/2004 | Shoemake et al. | 455/450 |
| 2006/0063543 A1* | 3/2006 | Matoba et al. | 455/509 |
| 2006/0094431 A1* | 5/2006 | Saifullah et al. | 455/436 |
| 2006/0184680 A1* | 8/2006 | Ruutu et al. | 709/229 |
| 2007/0026868 A1 | 2/2007 | Schulz et al. | 455/454 |
| 2007/0042733 A1* | 2/2007 | Tomioka | 455/179.1 |
| 2007/0293157 A1 | 12/2007 | Haartsen et al. | 455/67.11 |
| 2008/0298450 A1* | 12/2008 | Zhang | H04L 1/0006 375/227 |
| 2009/0163216 A1* | 6/2009 | Hoang et al. | 455/450 |
| 2009/0190566 A1* | 7/2009 | Kwon et al. | 370/345 |
| 2010/0057485 A1 | 3/2010 | Luft | 705/1 |
| 2011/0164580 A1* | 7/2011 | Keon | 370/329 |
| 2011/0194503 A1* | 8/2011 | Stanforth | 370/329 |
| 2011/0228666 A1* | 9/2011 | Barbieri et al. | 370/216 |
| 2011/0287794 A1 | 11/2011 | Koskela et al. | 455/509 |
| 2012/0039284 A1* | 2/2012 | Barbieri | H04W 48/10 370/329 |

OTHER PUBLICATIONS

3GPP TSG RAN WG1 #60 Meeting, San Francisco, United States, Feb. 22-16, 2010, R1-101453, "Macro+HeNB performance with escape carrier", Nokia Siemens Networks, Nokia, 4 pgs.

3GPP TSG RAN WG1 Meeting #60bis, Beijing, China, Apr. 12-16, 2010, R1-101925, "Considerations on issues in relation to ICIC schemes for heterogeneous networks", Nokia Siemens Networks, Nokia, 3 pgs.

3GPP TSG-RAN Wg2 Meeting #70, Montreal, Canada, May 10-14, 2010, R2-102889, "Discussion on MTC and RACH load", Nokia Corporation, Nokia Siemens Networks, 6 pgs.

3GPP TSG RAN WG4 #53, Jeju, Korea, Nov. 9-13, 2009, R4-094245, "Interference control for LTE rel-9 HeNB cells", Nokia Siemens Networks, Nokia, 10 pgs.

3GPP TSG-RAN #45, Sep. 15-18, 2009, Sevilla, Spain, RP-090991, "New SI proposal: RAN improvements for machine-type Communications", Huawei, et al., 5 pgs.

3GPP TSG-RAN #47, Vienna, Austria, Mar. 16-19, 2010, RP-100330, "Revised SID: RAN Improvements for Machine-type Communications", Huawei, 5 pgs.

3GPP TSG RAN#47, Vienna, Austria, Mar. 16-19, 2010, RP-100383, "New Work Item Proposal: Enhanced ICIC for non-CA based deployments of heterogeneous networks for LTE", CMCC, 5 pgs.

3GPP TS 36.101 V8.1.0 (Mar. 2008), "$3^{rd}$ Generation Partnership Project; Technical Specification Group Radio Access Network; Evolved Universal Terrestrial Radio Access (E-UTRA); User Equipment (UE) Radio Transmission and Reception", 6 pgs.

3GPP TS 36.331 V8.2.0 (May 2008), "$3^{rd}$ Generation Partnership Project; Technical Specification Group Radio Access Network; Evolved Universal Terrestrial Radio Access (E-UTRA) Radio Resource Control (RRC); Protocol specification (Release 8)", 151 pgs.

* cited by examiner

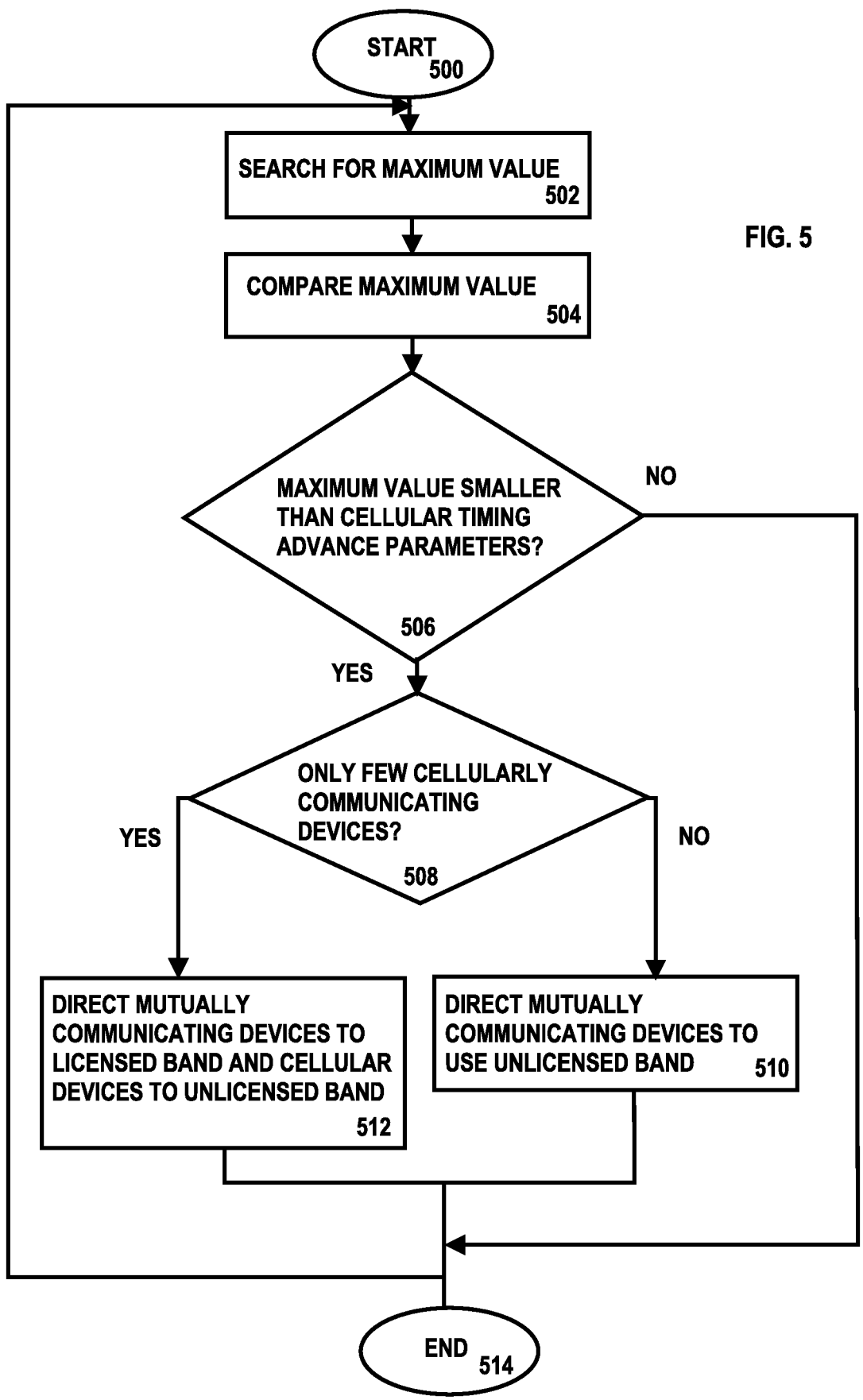

NETWORK CONTROL TO DIRECT USER DEVICES IN MUTUAL MACHINE-TO-MACHINE COMMUNICATIONS INTO UNLICENSED FREQUENCY BANDS TO DECREASE INTERFERENCE

FIELD

The invention relates to apparatuses, a method, computer program, computer program product and computer-readable medium.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Third Generation Partnership Project (3GPP) Long Term Evolution (LTE) and Long term Evolution advanced (LTE-A) programs are to develop technology in order to provide improved spectral efficiency, reduced latency, and more efficient use of radio resources for improved user experiences and faster data transmission. As a part of these efforts, the concept of an in-home, (evolved) node B (called H(e)NB) for LTE and LTE-A networks has been introduced.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: define at least two user device groups, one of the user device groups using licensed frequency band and another using unlicensed frequency band, determine transmission ranges of user devices, and assign the at least two user device groups to user devices based on comparison of the transmission ranges in such a manner that if the transmission range of the devices having mutual machine-to-machine communications exceeds the transmission range between devices communicating with a network node and that node, the devices having the mutual machine-to-machine communications are directed into the user device group using unlicensed frequency band for decreasing interference.

According to another aspect of the present invention, there is provided a method comprising: defining at least two user device groups, one of the user device groups using licensed frequency band and another using unlicensed frequency band, determining transmission ranges of user devices, and assigning the at least two user device groups to user devices based on the transmission range in such a manner that if the transmission range of the devices having mutual machine-to-machine communications exceeds the transmission range between devices communicating with a network node and that node, directing the devices having the mutual machine-to-machine communications into the user device group using unlicensed frequency band for decreasing interference.

According to yet another aspect of the present invention, there is provided an apparatus comprising: apparatus comprising: means for defining at least two user device groups, one of the user device groups using licensed frequency band and another using unlicensed frequency band, means for determining transmission ranges of user devices, and means for assigning the at least two user device groups to user devices based on comparison of the transmission ranges in such a manner that if the transmission range of the devices having mutual machine-to-machine communications exceeds the transmission range between devices communicating with a network node and that node, the devices having the mutual machine-to-machine communications are directed into the user device group using unlicensed frequency band for decreasing interference.

According to yet another aspect of the present invention, there is provided computer program embodied on a computer-readable storage medium, the computer program comprising program code for controlling a process to execute a process, the process comprising: defining at least two user device groups, one of the user device groups using licensed frequency band and another using unlicensed frequency band, determining transmission ranges of user devices, and assigning the at least two user device groups to user devices based on comparison of the transmission ranges in such a manner that if the transmission range of the devices having mutual machine-to-machine communications exceeds the transmission range between devices communicating with a network node and that node, the devices having the mutual machine-to-machine communications are directed into the user device group using unlicensed frequency band for decreasing interference.

According to yet another aspect of the present invention, there is provided computer-readable medium encoded with instructions that, when executed by a computer, perform: defining at least two user device groups, one of the user device groups using licensed frequency band and another using unlicensed frequency band, determining transmission ranges of user devices, and assigning the at least two user device groups to user devices based on comparison of the transmission ranges in such a manner that if the transmission range of the devices having mutual machine-to-machine communications exceeds the transmission range between devices communicating with a network node and that node, the devices having the mutual machine-to-machine communications are directed into the user device group using unlicensed frequency band for decreasing interference.

LIST OF DRAWINGS

Embodiments of the present invention are described below, by way of example only, with reference to the accompanying drawings, in which FIG. 1 illustrates an example of a system;

FIG. 5 is yet another flow chart, and

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of an access architecture to which the embodiments may be applied, a radio access architecture based on LTE Advanced, LTE-A, that is based on orthogonal frequency multiplexed access (OFDMA) in a downlink and a single-carrier frequency-division multiple access (SC-FDMA) in an uplink, without restricting the embodiments to such an architecture, however.

In an orthogonal frequency division multiplexing (OFDM) system, the available spectrum is divided into multiple orthogonal sub-carriers. In OFDM systems, available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB needs to know channel quality of each user device and/or the preferred precoding matrices (and/or other multiple input-multiple output (MIMO) specific feedback information, such as channel quantization) over the allocated sub-bands to schedule transmissions to user devices. Required information is usually signalled to the (e)NodeB.

Figure 1:
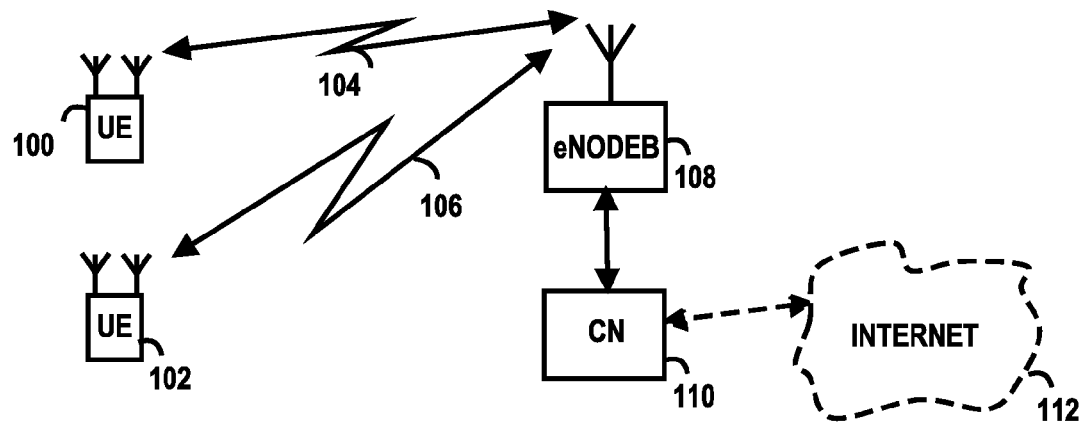

FIG. 1 is an example of a simplified system architecture only showing some elements and functional entities, all being logical units whose implementation may differ from what is shown. The connections shown in FIG. 1 are logical connections; the actual physical connections may be different. It is apparent to a person skilled in the art that the system typically comprises also other functions and structures than those shown in FIG. 1.

FIG. 1 shows a part of a radio access network of E-UTRA, LTE or LTE-Advanced (LTE-A). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

The embodiments are not, however, restricted to the system given as an example but a person skilled in the art may apply the solution to other communication systems provided with the necessary properties. Some examples of other options for suitable systems are the universal mobile telecommunications system (UMTS) radio access network (UTRAN or E-UTRAN), long term evolution (LTE, the same as E-UTRA), wireless local area network (WLAN or WiFi), world-wide interoperability for microwave access (WiMAX), Bluetooth®, personal communications services (PCS), wideband code division multiple access (WCDMA) and systems using ultra-wideband (UWB) technology.

FIG. 1 shows user devices 100 and 102 configured to be in a wireless connection on one or more communication channels 104, 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to a base station, an access point or any other type of interfacing device including a relay station capable of operating in a wireless environment.

The (e)NodeB includes transceivers, for instance. From the transceivers of the (e)NodeB, a connection is provided to an antenna unit that establishes bi-directional radio links to user devices. The (e)NodeB is further connected to a core network 110 (CN). Depending on the system, the counterpart on the CN side can be a serving system architecture evolution (SAE) gateway (routing and forwarding user data packets), packet data network gateway (PDN GW), for providing connectivity to user devices (UEs) to external packet data networks, or mobile management entity (MME), etc.

The communication system is also able to communicate with other networks, such as a public switched telephone network or the Internet.

The user device (also called UE, user equipment, user terminal, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, laptop computer, game console, notebook, and multimedia device.

The user device (or a layer 3 relay node) is configured to perform one or more of user equipment functionalities described below with an embodiment, and it may be configured to perform functionalities from different embodiments. The user device may also be called a subscriber unit, mobile station, remote terminal, access terminal, user terminal or user equipment (UE) just to mention but a few names or apparatuses.

It should be understood that, in the FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeB 108 of FIG. 1 may provide any kind of these cells. A cellular radio system may be implemented as a multilayer network including several kinds of cells. Typically, in multilayer networks, one node B provides one kind of a cell or cells, and thus a plurality of node Bs are required to provide such a network structure.

Recently for fulfilling the need for improving the deployment and performance of communication systems, concept of "plug-and-play" node (e)Bs has been introduced. Typically, a network which is able to use "plug-and-play" node (e)Bs, includes, in addition to Home node (e)Bs (Home(e)nodeBs), a home node B gateway, or HNB-GW (not shown in FIG. 1). A HNB Gateway (HNB-GW), which is typically installed within an operator's network aggregates traffic from a large number of HNBs back to a core network through Iu-cs and Iu-ps interfaces.

Term "plug-and-play" is used herein to describe an apparatus which can be coupled to a network with a minimum configuration work, typically such an apparatus is a self-configuring device. For enabling "plug-and-play" devices a self-organizing network (SON) and flexible spectrum use (FSU) concepts have been launched. The SON concept is for instance known in connection to computer networks and neural networks. The FSU enables devices to use spectrum in a flexible manner. In future networks, more frequency bands will be needed for new high-bit-rate wireless services.

A home node (e)B (sometimes being comparable to a femto or pico node) when coupled to broadband services providing an umbrella cell provides radio coverage for user devices. H(e)NBs may provide the capabilities of a standard node B as well as the radio resource management functions of a standard radio network controller (RNC).

A HN(e)B when serving as a "plug-and-play" node B may be a wireless access point purchased, installed and operated by a private user, a single user or a community, such as a university or a shopping centre.

A home node B may be used in a local area network (LAN) which is a computer network covering a relatively small geographical area, such as a home or office. Similar kinds of networks are personal area networks (PANs), campus area networks (CANs), or metropolitan area networks (MANS). Another network system where HNBs are typically used is a Wide Area Network (WAN) which is a network covering a relatively broad area. A WAN may be defined to be a network whose coverage crosses metropolitan, regional, or national boundaries. Probably the best-known example is the Internet.

An example of a network system is also a mixed Local Area/Wide Area (LA/WA) scenario in which several cellular networks of the same radio access technology (e.g. E-UTRA) being operated by different operators are deployed in the same geographical area, such as a modern home-and-office building complex, and are using the same radio spectrum resources.

The mixed LA/WA scenarios may for instance refer to hierarchical cell structures, such as to a LTE/LTE or LTE/LTE-A co-existence or hot spots with overlay network. Within LA/WA coverage, H(e)NBs or local node Bs (LNBs) of the same or different networks may be placed and set up next to each other in a short distance in a spatially uncoordinated fashion.

The integration of new network topologies into a cellular network rouses more and more attraction and interest both in industry and in the academics of telecommunications. One example of such a possible evolution is the inclusion of new wireless nodes often called machines. This requires enabling local communication directly among these machines under the control of a network or in an autonomous fashion. A communication network may also be a so-called heterogeneous network that is a network designed for both machine-to-machine (or device-to-device) and "normal" cellular communications. A heterogeneous network may provide following functionalities: device-to-device communication, cluster-wise communication, grid of local machines communicating with each other performing certain tasks, advanced device acting as a gateway for a bunch of low-capability devices or machines to access the network and/or secondary usage of cellular system spectrum, etc.

Devices capable of machine-to-machine communication may be used for many purposes, such as smart homes, smart metering, fleet management, remote healthcare and access network operation management.

The deployment of Home(e)NBs in heterogeneous networks creates new interference challenges due to the deployment of wireless nodes such as macro/micro eNBs, pico eNBs, and Home eNBs using the same spectrum resource. Typically, simultaneous machine-to-machine transmissions and "normal" cellular transmissions are scheduled to orthogonal resources in time domain or frequency domain on an uplink (UL) carrier (FDD system) or UL subframe (TDD system). However, when a cellular system approaches or achieves full capacity, uplink interference at an eNB receiver may be hard to avoid. Other solutions, such as using more carriers or handovers to other carriers do not use spectral resources in an efficient way.

Figure 2:
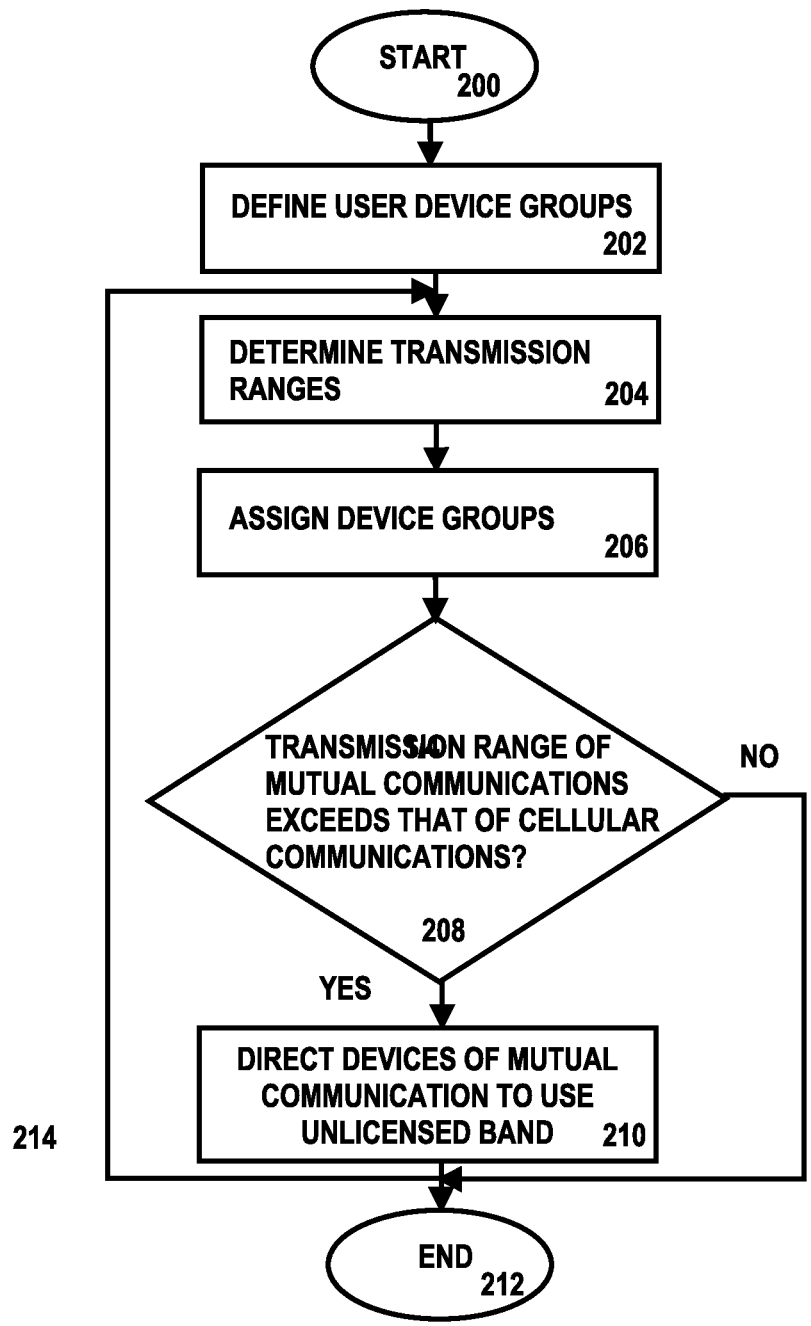
FIG. 2 is a flow chart.

In the following, an embodiment of a method for network control is explained in further detail by means of FIG. 2. An embodiment provides an option for controlling simultaneous machine-to-machine and normal cellular communications in a network. Typically, no interference measurements in relation to machine-to-machine transmissions are needed which simplifies the procedure.

When a new (e)NodeB is powered on, one or more component carriers are typically selected for the (e)NB for operation. Typically, a network node, such as a (e)NodeB assigns at least one primary carrier for the downlink (DL) and the uplink (UL) in the cellular frequency band to all the devices via radio resource control signaling for control signaling on the control plane.

The embodiment starts in block 200.

In block 202, at least two user device groups are defined. One of the device groups using licensed frequency band and another using unlicensed frequency band. Typically, the device groups are intended for all data-related communications on the user plane.

Revolutionary optimized local area (REVOLA) concept provides a local area radio system designed to complement existing cellular wide area systems, such as global system for mobile communications (originally from groupe spécial mobile (GSM)), universal mobile telecommunications system (UMTS), high-speed packet access (HSPA), long-term evolution (LTE) and LTE-Advanced.

In addition to licensed frequency bands, the local area system may be able to utilize license-exempt spectrum or white spaces (In this context, white spaces typically refer to spectrum allocated to a broadcasting service but not used in a certain geographical area, or spectrum left unused when analogue TV-broadcasts are terminated) to take the advantage of additional available bandwidth. This is typically based on utilizing a cognitive radio concept. Additionally, the local area system may offer an efficient machine-to-machine or device-to-device operation mode to establish ad-hoc networks. Local area technologies allow multi-operator local radio access on a licensed and unlicensed spectrum. These technologies are mainly designed to be an extension of traditional wide area networks to provide high-capacity Internet type of access for limited, high demand areas, such as indoor hot-spots or enterprise buildings.

License-exempt (LE) or unlicensed frequency bands are parts of frequency spectrum that are only lightly regulated; users do not need licenses to exploit them. Some of main services using LE spectrum are wireless local area networking technologies, such as wireless fidelity (WiFi), wireless local area network (WLAN), mesh networks, voice over Internet protocol (VoIP) telephony, etc.

In communication networks, an ad-hoc mode is suitable for wireless devices to directly communicate with each other. Operating in an ad-hoc mode allows wireless devices within a radio range of each other to communicate without involving central access points, such as base stations.

Cognitive radio is viewed as an approach to improve the utilization of the radio spectrum by providing a spectrum sharing scheme. The cognitive radio, which is typically built on a software-defined radio, may be defined as an intelligent wireless communication system that is aware of its environment and is able to learn from it and adapt to its statistical variations. Cognitive radio enables an efficient use of radio spectrum, both unlicensed and licensed frequency bands.

The definition of user groups may be carried out only once in the network configuration phase, or it may be in addition to this also be updated on a regular basis, or the definition may be carried out whenever needed during operation of the network, etc.

Defining user device groups may herein mean the defining process itself or receiving information from core network and carrying out process adaptation steps required for acting on the basis of the existence of these groups. The latter case may mean storing the group definitions in a memory. Other options also exist depending on current needs.

In block 204, transmission ranges of user devices are determined.

A transmission range may simply be derived based on propagation delay determined from device-wise timing advance (TA) parameters. In time division multiple access (TDMA) based systems, time-frames from each mobile device are usually synchronized when received by a network node. The synchronization is accomplished by using a timing advance parameter. In general, by using timing advance parameter, interference to and from other users in adjacent timeslots may be avoided or at least diminished, thereby data loss may be minimized and quality of service maintained.

In block 206, the at least two user device groups are assigned to user devices based on the comparison of transmission ranges in the following manner: (block 208) if the transmission range of the devices having mutual machine-to-machine communications exceeds the transmission range between devices communicating with a network node and that node, (block 210) the devices having the mutual machine-to-machine communications are directed into the user group using unlicensed band for decreasing interference.

The mutual machine-to-machine communications may be data transmission or a call from one home node to another home node without using an actual network node. The group of mutually communicating devices may also comprise more than just two devices, as in the case of a conference call or of data transmission from one source to a plurality of recipients. Any device capable to machine-to-machine communication may act as a home node.

Figure 4:
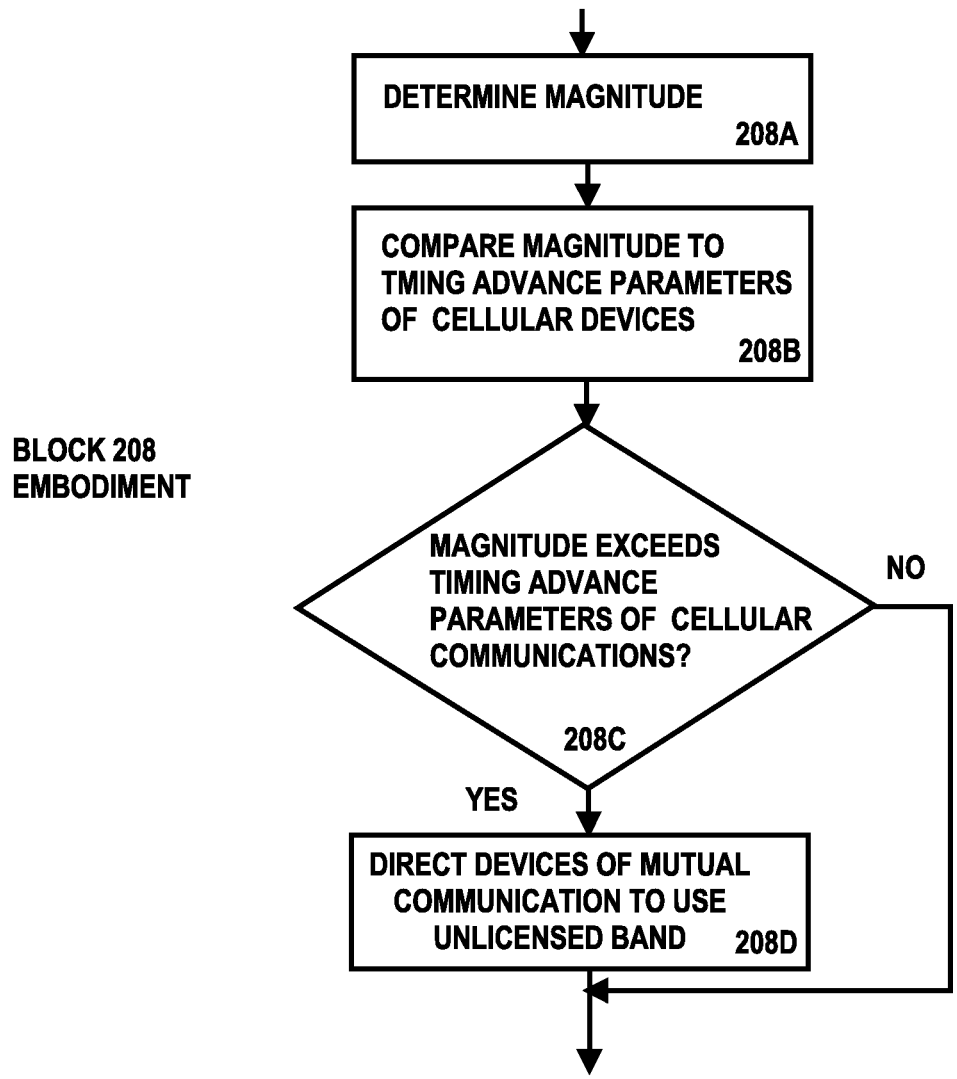
FIG. 4 is another flow chart.

By means for FIG. 4 an embodiment wherein the transmission range is determined by using a timing advance parameter is explained. The embodiment of FIG. 4 discloses in further detail one option for block 208 of FIG. 2.

In block 208A, magnitude of difference of timing advance parameters of the devices having the mutual machine-to-machine communications is determined. In block 208B, the magnitude of difference of timing advance parameters of the devices having the mutual machine-to-machine communications is compared to timing advance parameters of the devices communicating with the network node, and if (block 208C) the magnitude of difference of timing advance parameters of the devices having the mutual machine-to-machine communications exceeds the timing advance parameters of at least one of the devices communicating with the network node, (block 208D) the devices having the mutual machine-to-machine communications are directed into the user device group using unlicensed band. This embodiment is also repeatable.

Figure 3:
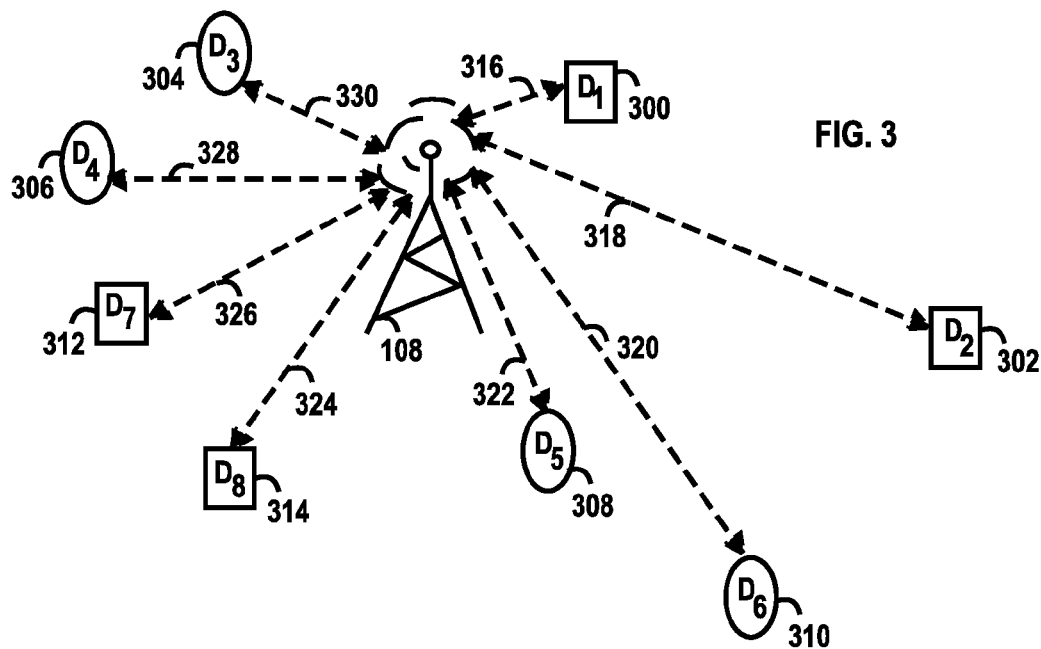
FIG. 3 shows an example of assigning user device groups to user devices.

The embodiment is further clarified by means of the following example and FIG. 3. The FIG. 3 illustrates a simplified example herein used only for clarification purposes. It does not limit practical implementations of embodiments by any means. It is obvious for a skilled person that more or less devices and communication connections may be present in a network. For example, machine-to-machine communicating devices are depicted only as pairs of devices for enabling the explanation of embodiments in an easily absorbable way.

In FIG. 3, dotted arrows (316-330) illustrate transmission ranges.

In FIG. 3, device pairs D1-D2 (300, 302) and D7-D8 (312, 314) (these device pairs being squares for the sake of clarity, the shape has no real-world meaning)) are in an active machine-to-machine connection. Further, devices D3, D4, D5, D6 (304, 306, 308, 310) (these devices being ellipses for the sake of clarity, the shape has no real-world meaning) are in an active cellular connection that is they communicate with (or via) a normal network node (108).

For decreasing interference machine-to-machine transmissions causes to cellular transmissions at a network node, devices are directed to use unlicensed band if the following condition is met:

$$|TA_{D_k} - TA_{D_l}| > TA_{D_t} \quad (1)$$

wherein $|\ |$ denotes magnitude, $TA_{D_k}$ denotes a timing advance parameter for a first device having machine-to-machine communications, $TA_{D_l}$ denotes a timing advance parameter for a second device having machine-to-machine communications, $>$ denotes greater than, and $TA_{D_t}$ denotes a timing advance parameter for a device communicating with a network node (having cellular communications).

If the condition is met, a risk exists that the interference has a significant influence in the network node receiver. How much greater the timing advance parameter for a device communicating with a network node (that is a device having cellular communications) should be than the magnitude of the difference of the timing advance parameters for a first and second device having machine-to-machine communications that significant interference will take place, depends naturally on current circumstances, but some assumptions can be made based on experience and also simulations when required. A theoretical interference analysis may also be an option.

In the example of FIG. 3, the condition of Inequality (1) is met for a device pair D1-D2 (300, 302) and devices D3, D4, D5 (304, 306, 308) located close to the network node (108). The transmission range between devices D1 (300) and D2 (302) significantly exceeds the transmission range between the devices D3, D4, D5 and the network node (108). Device pair D7-D8 (312, 314) doesn't meet the condition of Inequality (1). Hence, the network node assigns the device pair D1-D2 (300, 302) to a user device group using unlicensed band and devices D3, D4, D5 (304, 306, 308) to a user device group using licensed band for decreasing interference the network node receiver experiences.

The condition of Inequality (1) is typically checked first and selected mutually communicating devices are directed to use unlicensed frequency band to avoid or at least to diminish machine-to-machine interference to cellular devices (devices communicating with or via a normal network node) assigned to a user device group using licensed spectrum.

Then, to prevent cellular interference (interference caused by devices having cellular communications) to machine-to-machine communications, the following embodiment depicted in FIG. 5 may be carried out: the embodiment starts in block 500. In block 502, a maximum value of the timing advance parameters of the devices having the mutual machine-to-machine communications is searched for and (block 504) the maximum value of the timing advance parameters of the devices having the mutual machine-to-machine communications is compared to the timing advance parameters of devices communicating with the network node. If (block 506) the maximum value of the timing advance parameters of the devices having the mutual machine-to-machine communications is below the timing advance parameters of devices communicating with the network node, (blocks 508, 510) the devices having the mutual machine-to-machine communications are directed into the user device group using unlicensed band, or in blocks 508, 512, in case of a plurality of devices having mutual machine-to-machine communications located close to the network node and fewer devices communicating with the network node, the devices having mutual machine-to-machine communications are directed into the user device group using licensed band and the devices communicating with the network node are directed into the user device group using unlicensed band. The embodiment ends in block 514. Arrow 516 shows one possibility for repetition of the embodiment.

The second condition may be written as:

$$\max(TA_{D_k}, TA_{D_r}) < TA_{D_t} \quad (2)$$

wherein max( ) denotes a maximum value, $TA_{D_k}$ denotes a timing advance parameter for a first device having machine-to-machine communications, $TA_{D_r}$ denotes a timing advance parameter for a second device having machine-to-machine communications, < smaller than, and $TA_{D_t}$ denotes a timing advance parameter for a device communicating with a network node (having cellular communications).

In the example of FIG. 3, the second condition is met for a cellular device (that is a device communicating with or via a normal network node) D6 (310) and devices having mutual machine-to-machine communications D7-D8 (312, 314). The transmission range of devices D7 (312) or D8 (314) is significantly smaller than the transmission range between the cellular devices D6 (310) and the network node. Hence, the network node may assign devices D7-D8 (312, 314) to a user device group using unlicensed frequency band and device D6 (310) to a user device group using licensed band.

Alternatively, in case there are several devices having mutual machine-to-machine communications close to the network node and only relatively few cellular devices meeting the second condition, the network node may instead assign the devices having mutual machine-to-machine communications to the licensed band and the cellular devices to the unlicensed band.

The grouping may further be based on priorities (for example, if a user has been purchased a higher priority status or a transmission is prioritized), capabilities of devices (e.g. capability to cellular communication and/or machine-to-machine communications), locations of the devices and/or channel conditions.

Each device group typically has a unique device group identifier. Individual devices may be directed to use other group's frequency band when needed by radio resource control signaling. In general, the device group identifier may be used for common signaling to reduce signaling overhead. A radio resource signaling procedure using device group identifier may be used to switch a device using a primary carrier in a licensed frequency band to a secondary carrier in an unlicensed frequency band. Likewise, a similar procedure may be used to switch a device using a secondary carrier in an unlicensed band to a primary carrier in a licensed frequency band. The latter may be required in the case strong uplink interference is caused by devices communicating with a neighbour network node.

Typically, the network node is designed to be aware of resources (time slot and/or frequency band) allocated to each device. Hence, the network node may evaluate based on the conditions of Inequalities (1) and (2), which of the devices having machine-to-machine communications may interfere cellular transmissions and which cellular devices may cause interference to devices having machine-to-machine transmissions.

Existing resources may only be used in uplink timing alignment during initial cell access or for maintenance of uplink timing alignment.

Exemplifying signaling in LTE-systems may be as follows: A mobility management entity (MME) may obtain knowledge from access points, such as WLAN access points, to obtain information about the resource utilization on a regular basis or when required. Further, the MME may also obtain measurement information from devices via a network node about the utilization of an unlicensed frequency band of interest.

The information about the resource utilisation and the availability of the unlicensed bands of the MME may be utilized by a network node while directing uplink transmissions to different device groups. The network node may continue the information exchange with the MME about the unlicensed band utilisation for configuring coming secondary carrier switching on need basis A user device may switch to a secondary carrier on the unlicensed band when it does not transmit.

Since WLAN-systems typically use unlicensed spectrum, it may occur that an LTE-network plans to allocate LTE-communication to that part of the spectrum. Then an LTE-network node may schedule time and/or frequency resources to "fit" in a currently inactive WLAN channel. Transmission power may be set to be within an existing power limit set for WLAN transmissions as well.

Radio resource control signaling for a secondary carrier configuration on an unlicensed frequency band may be carried out periodically. The devices communicating with or via a network node (herein called cellular devices) and the network node may update unlicensed frequency band configuration parameters at regular intervals via radio resource control signaling on a primary band.

The embodiment ends in block 212. The embodiment is repeatable and one option for repetition is shown with arrow

214. The arrow shows the option when the user device groups are not redefined in every round of the procedure. Other options are naturally possible for the user device group definition as explained above.

The steps/points, signaling messages and related functions described above in FIGS. 2, 4 and 5 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

It should be understood that transmitting and/or receiving may herein mean preparing a transmission and/or reception, preparing a message to be transmitted and/or received, or physical transmission and/or reception itself, etc on a case by case basis.

An embodiment provides an apparatus which may be any node, host, user device or any other suitable apparatus able to carry out processes described above in relation to FIGS. 2, 4 and 5.

Figure 6:
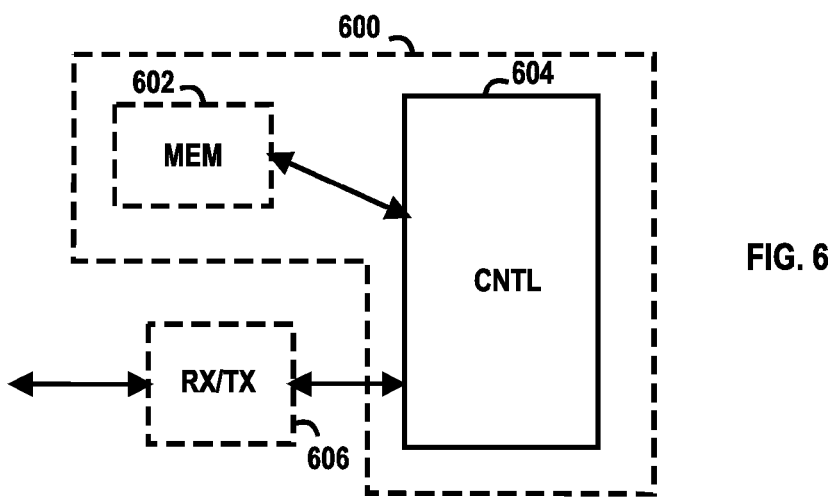
FIG. 6 illustrates an example of an apparatus.

FIG. 6 illustrates a simplified block diagram of an apparatus according to an embodiment especially suitable for network control. It should be appreciated that the apparatus may also include other units or parts than those depicted in FIG. 6. Although the apparatus has been depicted as one entity, different modules and memory (one or more) may be implemented in one or more physical or logical entities.

The apparatus 600 may in general include at least one processor, controller or a unit designed for carrying out control functions operably coupled to at least one memory unit and to various interfaces. Further, a memory unit may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus.

The apparatus may be a software application, or a module, or a unit configured as arithmetic operation, or as a program (including an added or updated software routine), executed by an operation processor. Programs, also called program products or computer programs, including software routines, applets and macros, can be stored in any apparatus-readable data storage medium and they include program instructions to perform particular tasks. Computer programs may be coded by a programming language, which may be a high-level programming language, such as objective-C, C, C++, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as a single-chip computer element, or as a chipset, including at least a memory for providing storage capacity used for arithmetic operation and an operation processor for executing the arithmetic operation.

As an example of an apparatus according to an embodiment, it is shown an apparatus, such as a node device, including facilities in a control unit 604 (including one or more processors, for example) to carry out functions of embodiments, such as determining transmission ranges of user devices and assigning user device groups. This is depicted in FIG. 6.

The apparatus may also include at least one processor 604 and at least one memory 602 including a computer program code, the at least one memory and the computer program code configured to, with the at least one processor, cause the apparatus at least to:

Another example of an apparatus comprises means (602, 604) for defining at least two user device groups, one of the user device groups using licensed frequency band and another using unlicensed frequency band, means (604) for determining transmission ranges of user devices, and means (604) for assigning the at least two user device groups to user devices based on the transmission range in such a manner that if the transmission range of the devices having mutual machine-to-machine communications exceeds the transmission range between devices communicating with a network node and that node, directing the devices having the mutual machine-to-machine communications into the user device group using unlicensed frequency band for decreasing interference.

Yet another example of an apparatus comprises a definer configured to define at least two user device groups, one of the user device groups using licensed frequency band and another using unlicensed frequency band, a determiner configured to determine transmission ranges of user devices, an assigner configured to assign the at least two user device groups to user devices based on the transmission range in such a manner that if the transmission range of the devices having mutual machine-to-machine communications exceeds the transmission range between devices communicating with a network node and that node, the devices having the mutual machine-to-machine communications are directed into the user device group using unlicensed frequency band for decreasing interference.

Embodiments of FIGS. 4 and 5 may be carried out in processor or control unit 604 possibly with aid of memory 602.

It should be appreciated that different units may be implemented as one module, unit, processor, etc, or as a combination of several modules, units, processor, etc.

It should be understood that the apparatuses may include other units or modules etc. used in or for transmission. However, they are irrelevant to the embodiments and therefore they need not to be discussed in more detail herein. Transmitting may herein mean transmitting via antennas to a radio path, carrying out preparations for physical transmissions or transmission control depending on the implementation, etc. The apparatus may utilize a transmitter and/or receiver which are not included in the apparatus itself, such as a processor, but are available to it, being operably coupled to the apparatus. This is depicted as an option in FIG. 6 as a transceiver 606. Embodiments provide computer programs embodied on a distribution medium, comprising program instructions which, when loaded into electronic apparatuses, constitute the apparatuses as explained above.

Other embodiments provide computer programs embodied on a computer readable medium, configured to control a processor to perform embodiments of the methods described above. The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
   at least one processor and at least one memory including a computer program code, the at least one memory and the computer program code configured to, with the at least one processor, cause the apparatus at least to:
   define, by a network node, at least two user device groups, one of the user device groups using a licensed frequency band and another using an unlicensed frequency band;
   determine timing advance parameters of user devices; and
   assign the user devices into one of the at least two user device groups based on comparison of the timing advance parameters in such a manner that
   if a magnitude of differences of timing advance parameters of the user devices having mutual machine-to-machine communications exceeds the a timing advance parameter of at least one user device communicating with the network node, the user devices having the mutual machine-to-machine communications are directed into the user device group using the unlicensed frequency band for decreasing interference.

2. The apparatus of claim 1, wherein the at least one memory and the computer program code are further configured to, with the at least one processor, cause the apparatus at least to:
   search for a maximum value of the timing advance parameters of the user devices having the mutual machine-to-machine communications;
   compare the maximum value of the timing advance parameters of the user devices having the mutual machine-to-machine communications to the timing advance parameters of user devices communicating with the network node, and
   if the maximum value of the timing advance parameters of the user devices having the mutual machine-to-machine communications is below the timing advance parameters of the user devices communicating with the network node,
   direct the user devices having the mutual machine-to-machine communications into the user device group using the unlicensed frequency band, or
   in case of a plurality of user devices having mutual machine-to-machine communications located close to the network node and fewer user devices communicating with the network node, direct the user devices having the mutual machine-to-machine communications into the user device group using the licensed frequency band and direct the user devices communicating with the network node into the user device group using the unlicensed frequency band.

3. The apparatus of claim 1, wherein the grouping is also based on priorities, capabilities of devices, locations of the user devices and/or channel conditions.

4. The apparatus of claim 1, wherein each of the user device groups has a unique user device group identifier.

5. A method comprising:
   defining, by a network node, at least two user device groups, one of the user device groups using a licensed frequency band and another using an unlicensed frequency band;
   determining timing advance parameters of user devices; and
   assigning the user devices into one of the at least two user groups based on the timing advance parameters in such a manner that
   if a magnitude of differences of timing advance parameters of the user devices having mutual machine-to-machine communications exceeds a timing advance parameter of at least one user device communicating with the network node, directing the user devices having the mutual machine-to-machine communications into the user device group using the unlicensed frequency band for decreasing interference.

6. The method of claim 5, further comprising:
   searching for a maximum value of the timing advance parameters of the user devices having the mutual machine-to-machine communications;
   comparing the maximum value of the timing advance parameters of the user devices having the mutual machine-to-machine communications to the timing advance parameters of user devices communicating with the network node, and
   if the maximum value of the timing advance parameters of the user devices having the mutual machine-to-machine communications is below the timing advance parameters of user devices communicating with the network node;
   directing the user devices, having the mutual machine-to-machine communications into the user device group using the unlicensed frequency band, or
   in case of a plurality of user devices having mutual machine-to-machine communications located close to the network node and fewer user devices communicating with the network node directing the user devices having the mutual machine-to-machine communications into the user group using the licensed frequency band and directing the user devices communicating with the network node into the user device group using the unlicensed frequency band.

7. The method of claim 5, wherein the grouping is also based on priorities, capabilities of the user devices, locations of the user devices and/or channel conditions.

8. The method of claim 5, wherein each of the user device groups has a unique user device group identifier.

9. An apparatus comprising:
means for defining, by a network node, at least two user device groups, one of the user device groups using a licensed frequency band and another using an unlicensed frequency band;
means for determining timing advance parameters of user devices; and
means for assigning the user devices into one of the at least two user groups based on comparison of the timing advance parameters in such a manner that
if a magnitude of differences of timing advance parameters of the user devices having mutual machine-to-machine communications exceeds a timing advance parameter of at least one user device communicating with the network node, the user devices having the mutual machine-to-machine communications are directed into the user device group using the unlicensed frequency band for decreasing interference.

10. A computer program product comprising non-transitory computer-readable storage medium, the computer program comprising program code for controlling a process to execute a process, the process comprising:
defining, by a network node, at least two user device groups, one of the user device groups using a licensed frequency band and another using an unlicensed frequency band;
determining timing advance parameters of user devices; and
assigning the user devices into one of the at least two user device groups based on comparison of the timing advance parameters in such a manner that
if a magnitude of differences of timing advance parameters of the user devices having mutual machine-to-machine communications exceeds a timing advance parameter of at least one user device communicating with the network node, the user devices having the mutual machine-to-machine communications are directed into the user device group using the unlicensed frequency band for decreasing interference.

11. The computer program product of claim 10, wherein the process further comprises:
searching for a maximum value of the timing advance parameters of the user devices having the mutual machine-to-machine communications;
comparing the maximum value of the timing advance parameters of the user devices having the mutual machine-to-machine communications to the timing advance parameters of user devices communicating with the network node, and
if the maximum value of the timing advance parameters of the user devices having the mutual machine-to-machine communications is below the timing advance parameters of user devices communicating with the network node
directing the user devices having the mutual machine-to-machine communications into the user device group using the unlicensed frequency band, or
in case of a plurality of user devices having mutual machine-to-machine communications located close to the network node and fewer user devices communicating with the network node directing the user devices having the mutual machine-to-machine communications into the user device group using the licensed frequency band and directing the user devices communicating with the network node into the user device group using the unlicensed frequency band.

12. The computer program product of claim 10, wherein the grouping is also based on priorities, capabilities of the user devices, locations of the user devices and/or channel conditions.

13. The computer program of claim 10, wherein each of the user device groups has a unique user device group identifier.

14. A non-transitory computer-readable medium encoded with instructions that, when executed by a computer, cause the computer to perform:
defining, by a network node, at least two user device groups, one of the user device groups using a licensed frequency band and another using an unlicensed frequency band;
determining timing advance parameters of user devices; and
assigning the user devices into one of the at least two user device groups based on comparison of the timing advance parameters in such a manner that
if a magnitude of differences of timing advance parameters of the devices having mutual machine-to-machine communications exceeds a timing advance parameter of at least one user device communicating with the network node, the user devices having the mutual machine-to-machine communications are directed into the user device group using the unlicensed frequency band for decreasing interference.

* * * * *